United States Patent [19]
Nizza

[11] Patent Number: 5,762,529
[45] Date of Patent: Jun. 9, 1998

[54] MULTI-SIDED COLORED MIRROR IMAGE BLOCK SET

[75] Inventor: Robert Nizza, 20 Grant Ave., Islip, N.Y. 11751

[73] Assignee: Robert Nizza, Islip, N.Y.

[21] Appl. No.: 699,794

[22] Filed: Aug. 19, 1996

[51] Int. Cl.$^6$ .......... A63H 33/04; A63H 33/08; G09B 25/00
[52] U.S. Cl. .......... 446/85; 496/124; 496/125; 434/403; 52/311.2; 52/604; 52/608
[58] Field of Search .......... 52/311.2, 604, 52/608, DIG. 10; 434/403, 211; 273/157 R, 155, 160, 276; 446/85, 117, 118, 124, 125

[56] References Cited

U.S. PATENT DOCUMENTS

| | | | |
|---|---|---|---|
| 735,079 | 8/1903 | Fisher | 53/311.2 |
| 2,216,915 | 10/1940 | Johnson | |
| 2,992,829 | 7/1961 | Hopkins | 434/403 X |
| 3,659,360 | 5/1972 | Zeischegg | |
| 4,021,939 | 5/1977 | May | 446/118 X |
| 4,121,831 | 10/1978 | Greene | |
| 4,133,538 | 1/1979 | Ambrose | |
| 4,323,244 | 4/1982 | Busing | 273/155 |
| 4,323,245 | 4/1982 | Beaman | |
| 4,334,871 | 6/1982 | Roane | 434/403 X |
| 4,753,622 | 6/1988 | Nakama | |
| 4,778,392 | 10/1988 | Mitchell | 434/403 |
| 4,796,888 | 1/1989 | Louez | 434/403 X |
| 5,169,352 | 12/1992 | Petersen | |
| 5,221,223 | 6/1993 | Kao | |
| 5,306,198 | 4/1994 | Forman | 446/124 X |
| 5,417,604 | 5/1995 | Rafelman et al. | 446/124 |

FOREIGN PATENT DOCUMENTS

| | | | |
|---|---|---|---|
| 2527220 | 12/1976 | Germany | 446/117 |
| 8135 | 12/1839 | United Kingdom | 52/608 |

*Primary Examiner*—Michael A. Brown
*Assistant Examiner*—D. Neal Muir
*Attorney, Agent, or Firm*—Alfred M. Walker

[57] ABSTRACT

An educational set of amusement blocks includes a set of a plurality of pairs of mirror image multi-sided sided blocks. In each set, each block preferably includes seven sides, including various geometric shapes for each side. The blocks are stable, and can stand independently on five of the seven sides. The seven sides are distributed over the three dimensional surface of each block, so as to form structures having a wide base for weight distribution. Each block includes a cantilevered peak, to effect stability, and thereby enable the blocks to stand on five of its seven sides. Because of their stability, the blocks do not topple so easily, and therefore can be used for building intricate structures without the need for interlocking joints. Corresponding planes of one type of block and its mirror image are either painted the same color or in complementary colors, thereby forming patterns which are pleasing to the eye. In constructing structures with the blocks, there is not one single solution, but any number of satisfying outcomes. Any given configuration is unified by a harmonious color scheme, but there are actually a number of color schemes encoded in the blocks.

16 Claims, 9 Drawing Sheets

1 RED

2 DARK BLUE

3 LIGHT BLUE

4 LIGHT PINK

5 HOT PINK

6 ORANGE

7 PURPLE

8 SUNFLOWER YELLOW

9 GREEN

10 LAVENDER

MULTI-SIDED COLORED MIRROR IMAGE BLOCK SET

FIELD OF THE INVENTION

This invention relates to a set of multi-sided blocks of one general design wherein two different sub-types are mirror images of each other. Although other configurations are possible, the blocks preferably have seven sides which are colored in harmonious colors. These blocks are used for amusement purposes or they can be used to model certain types of architectural and/or decorative structures. The set of blocks may also be used in an educational setting to inspire and encourage creativity, due to the open-ended nature of its many assembled solutions.

BACKGROUND OF THE INVENTION

Numerous games and building block sets are available which use rectangular or cubic elements. Other blocks are designed to interlock with each other to permit the building of structures many blocks high with cantilevered sections. Some blocks are available in different colors or have sides of different color. Differently shaped blocks are often used in solution oriented puzzles with a specific objective to the building exercise.

For example, U.S. Pat. No. 4,133,538 of Ambrose teaches the use of three differently shaped block types to build a pyramid. U.S. Pat. No. 4,323,245 of Beaman discloses an amusement device consisting of a large number of differently shaped interfitting blocks or modules that can likewise be used to build a solid equilateral tetrahedron or other solid shapes.

Furthermore, U.S. Pat. No. 5,169,352 of Petersen relates to a system of structural form bodies shaped as polyhedrons with outward extending protuberances or inward extending notches. These can be used together to form many interesting shapes.

U.S. Pat. No. 4,753,622 of Nakama teaches the use of a set of blocks of identical size and shape, namely, an elongated prismatic shape with an isosceles trapezoid cross section. These blocks can be used to make many interesting structures especially when the faces of the blocks are of different colors. Moreover, the angled building blocks of U.S. Pat. No. 5,221,223 of Kao can be used to build many different shapes including ones with deep recesses. U.S. Pat. No. 4,121,831 of Greene describes a variety of octahedron assemblies that can be assembled from two basic elements in the form of U-shaped and V-shaped pieces of triangular cross section. U.S. Pat. No. 3,659,360 of Zeischegg introduces the concept of adhesive means to interconnect the pyramid-shaped pieces in either face-abutting or articulated edge-abutting relation.

U.S. Pat. No. 2,216,915 of Johnson discloses a puzzle consisting of a particular arrangement of two identical blocks to form a triangular pyramid.

Ambrose '538, Beaman '245, Greene '831 and Johnson '915 are basically solution oriented sets. While Zeischegg '360 facilitates the building of a variety of structural shapes, they are limited to regular and semi-regular polyhedrons, and the objective is of the nature of a puzzle. Nakama '622 and Kao '223 support the building of many types of design configurations, but only Nakama '622 alludes to the use of color to enhance the appearance of the structures.

None of these cited inventions have basic blocks which offer visual interest so as to entice a young child to pick up the piece and examine its many facets.

OBJECTS OF THE INVENTION

Accordingly, it is an object of the present invention to provide a set of building blocks of much visual interest by virtue of their harmonious color combinations and unique shapes including protruding and cantilevered elements.

Yet another object of the present invention is to provide two types of blocks which are mirror images of each other, and which have most corresponding surfaces of the same color while a select few are in harmoniously contrasting colors.

Still a further object of this invention is to provide a simple general block design with seven sides that can stand unaided on five of the seven sides.

Another object of the present invention is to permit a special configuration of the mirror image pair of blocks that will stand in a stable configuration on a further, sixth side of the sides, wherein the separate pieces will not stand unaided on the sixth side alone.

It is yet another object of the present invention to instruct in the method of manufacture to insure high quality at a reasonable cost.

Another object of the present invention is to limit the number of different types of blocks to two in order to reduce manufacturing cost while still affording a wide range of structural possibilities.

It is another object of the present invention to improve over the disadvantages of the prior art.

SUMMARY OF THE INVENTION

In keeping with these objects and others which may become apparent, the present invention includes a set of pairs of mirror image blocks.

The educational or toy blocks of the present invention include a set of a plurality of pairs of mirror image multi-sided blocks for education and amusement.

Each block has a plurality of surface sides, such as "S" number of sides, such as seven sides, wherein the sides are configured so that each block independently stands on "S minus 2" ("S–2") sides, such as five sides, and stands also on a further side, such as a sixth side, in conjunction with a mirror image block, also standing on a corresponding mirror image further side, such as a sixth side thereof. Therefore, when supported by a mirror image block, each block, having "S" number of sides, such as seven sides, may stand on any one of "S–1" number of sides, such as six sides.

In each set, each block preferably includes seven sides, including various geometric shapes for each side, such as a rectangle, two triangles, a trapezoid and three truncated rectangles, which each form a right angle triangle above a contiguous rectangle.

While the seven sided configurations can vary, the blocks are stable, since the seven sides are distributed over the three dimensional surface of each block, so as to form structures having a wide base for weight distribution. Because of the weight distribution and geometry of each block, the center of gravity is located to permit each block to stand independently on five of its seven sides, and to stand in conjunction with a second mirror image block on a sixth side, as noted above.

Such configurations also enable the blocks to be stacked vertically, or in a three dimensional assembly. Each block includes a cantilevered peak, to effect stability, and thereby enable the blocks to stand on five of its seven sides.

Because of their stability, the blocks do not topple so easily, and therefore can be used for building intricate structures without the need for interlocking joints, such as found in many joinable building blocks.

Another feature which also encourages stability is the fact that the blocks come in pairs of mirror image blocks, so that each block of the pair of blocks may be placed back-to-back at selected surfaces for further stability.

Preferably the blocks generally come in sixteen pairs of two mirror image blocks each, but the number of pairs can vary.

Corresponding planes of one type of block and its mirror image are either painted the same color or in complementary colors, thereby forming patterns which are pleasing to the eye. In constructing structures with the blocks, there is not one single solution, but any number of satisfying outcomes. Any given configuration is unified by a harmonious color scheme, but there are actually a number of color schemes encoded in the blocks.

According to which plane is the plane in contact with the table or base surface upon which the block structure is constructed, other colors and planes are eclipsed and are not visible, allowing an entirely different color scheme to be shown.

The basic configuration of each of the mirror image blocks can be best explained by starting with an example of a rectangular block three units long, two units wide and one unit high. The building blocks of the present invention are simply formed by making three cuts, preferably at about 45 degree angles to the three major axes of the rectangular block, thus removing sections including triangular faces. The first cut is from the bottom of the block at one end of the length leading upward through the height at about 45 degrees. The second cut is from the opposite end of the length, again from the bottom leading upward at about 45 degrees. At this point the block has an isosceles trapezoidal cross section with a base three units long and a top one unit long. A third cut is now made at about 45 degrees to the length dimension through the height from one corner of the block. The choice of corner determines whether a "left" or "right" oriented block results to form one particular block of a mirror image pair of blocks. The resulting blocks have seven surfaces, as well as protruding and cantilevered elements.

In the preferred embodiment a total of ten different harmonious colors are used to paint the fourteen surfaces of the mirror image pair of blocks.

A set of blocks includes a number of these mirror image pairs with identical shapes and color schemes.

Although any number of mirror image pairs can be included in a set, one including 16 pairs of blocks can support the construction of many varying configurations which mimic architectural patterns or natural forms.

Preferably a high friction base pad of foam rubber or polyurethane, is included in the set of blocks, to enhance the building of different configurations by helping to keep the blocks from moving and falling.

The sets of mirror image block pairs can create many structural configurations, either with or without central depressions.

BRIEF DESCRIPTION OF THE DRAWINGS

The present invention can best be understood in conjunction with the accompanying drawings, in which:

FIGS. 2A and 2B are a top plan views of each block of the mirror image pair of blocks of the set of blocks of the present invention, wherein FIG. 2A shows a "Left" oriented block and FIG. 2B shows a "Right" oriented block;

FIGS. 5A–5F show various views of a "Left" oriented block; wherein:

FIGS. 6A–6F show various views of a "Right" oriented block, wherein:

FIGS. 7A–7D are perspective views of four constructions, using the pairs of blocks of the present invention, wherein:

DETAILED DESCRIPTION OF THE DRAWINGS

Although many color combinations and color/face assignments are possible, the preferred embodiment shown in FIGS. 2–7D involves the use of ten harmonious colors in a particular assignment to the fourteen faces of the basic mirror image block pair.

Figure 1:
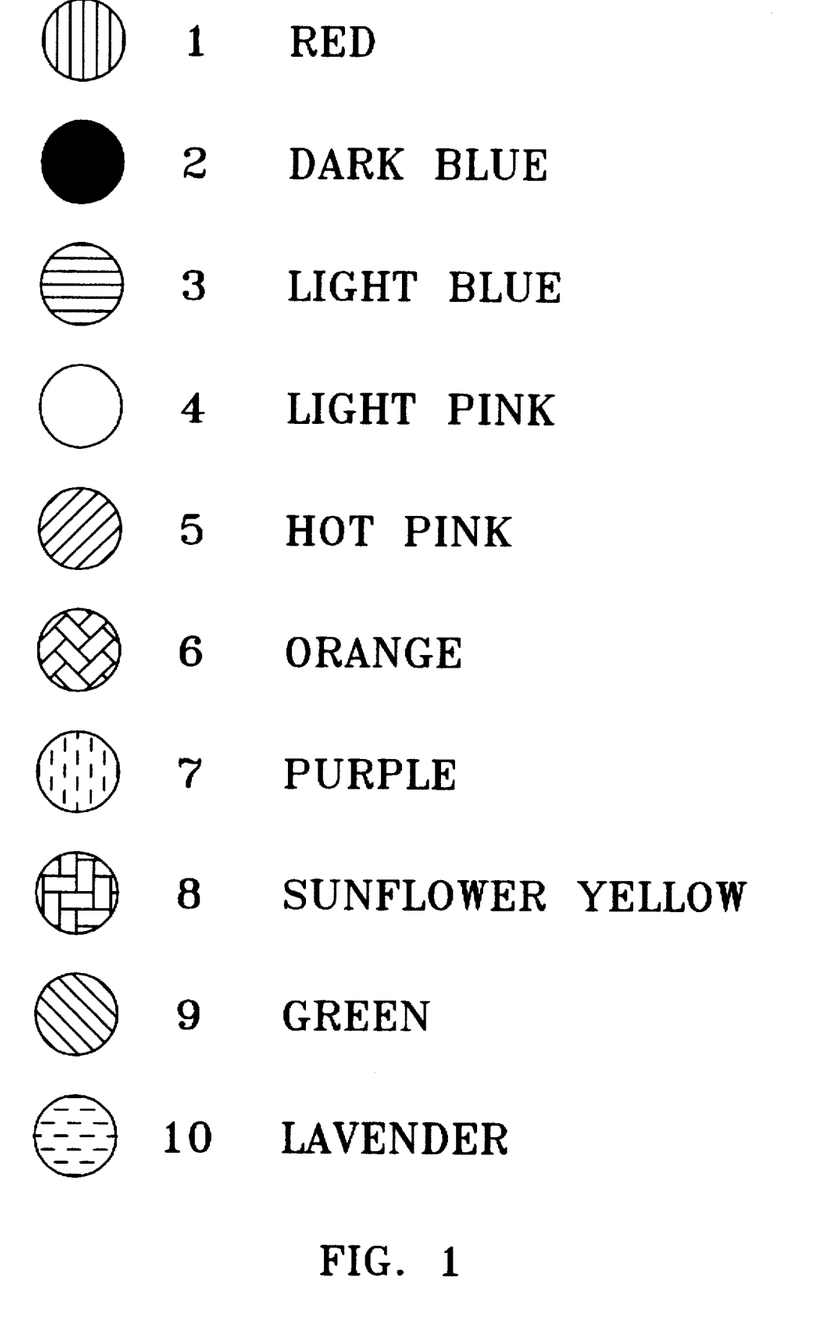
FIG. 1 is a table of a color key for the colors of the blocks of a preferred embodiment of the set of blocks of the present invention.

FIG. 1 shows a color key to be used to represent these ten colors shown in the remainder of drawing FIGS. 2–7D herein.

Figure 2A:
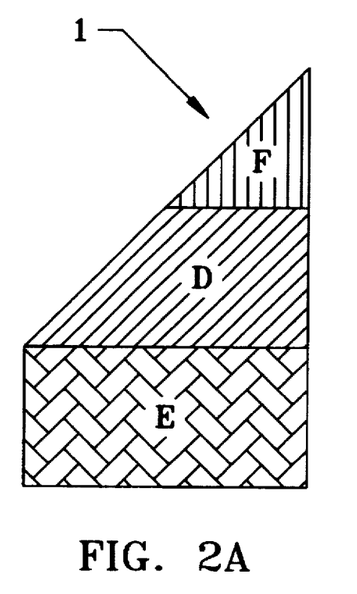
Figure 2B:
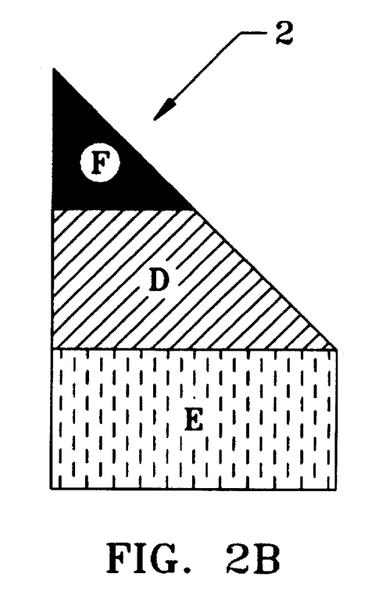

FIGS. 2A–2B show top views of a respective mirror image block pair with the left block 1 shown in FIG. 2A and the right block 2 shown in FIG. 2B. Capital letters A–G are used to identify the various sides or faces of each of the blocks, with corresponding faces having the same designation on each of the mirror image blocks.

For example, in FIG. 2A–2B, faces F, D and E are clearly visible. Face D is colored in the same hot pink on both blocks while face E on the left block is orange and face E on the right block is purple. Face F of the left block is colored red while F on the right block is dark blue.

Figure 3:
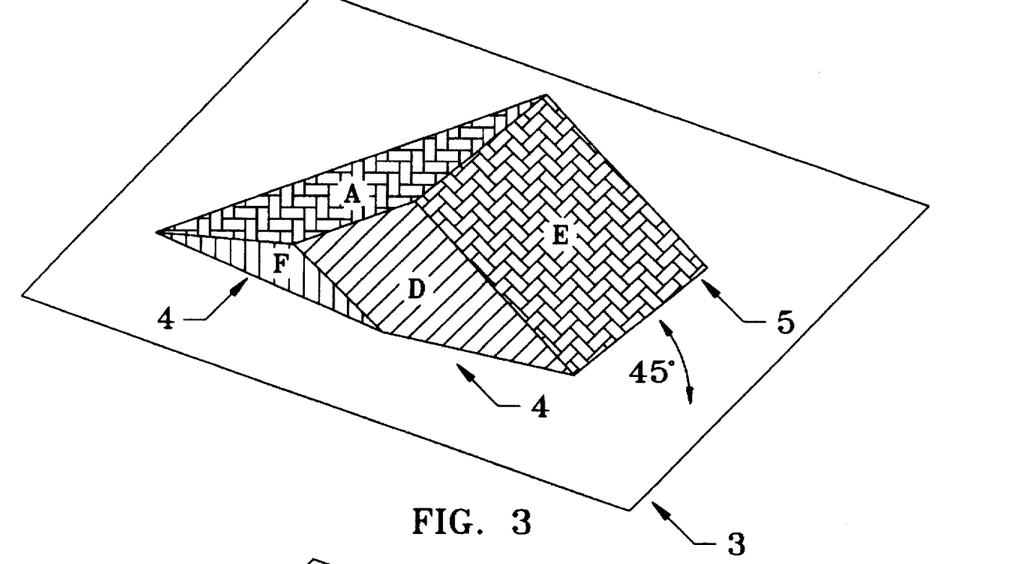
FIG. 3 is an isometric view of the "Left" oriented block of the present invention, as in FIG. 2A.

FIG. 3 is an isometric view of a left block 1, standing on face G, on a base pad 3. Edges 4 are in contact with base pad 3 while edge 5 is cantilevered up and away from the base pad at angle "x", which is about 45 degrees. In FIG. 3, face A is sunflower yellow, showing its isosceles trapezoidal shape, in accordance with what is clearly visible in the color key table of FIG. 1.

FIG. 5A–5F detail various views of the left block 1, showing all seven faces and their respective colors.

FIG. 6A–6F are similar representations of the right block 2. Only three of the corresponding faces, B, F and E, of the mirror image pair are differentially colored. It has been found that striking patterns are reinforced by the similar coloring of corresponding faces in many constructions. Also, the similar coloring on the other four faces of the mirror image blocks help in identifying corresponding faces of the mirror image blocks as an aid in making coherent constructions.

Figure 4:
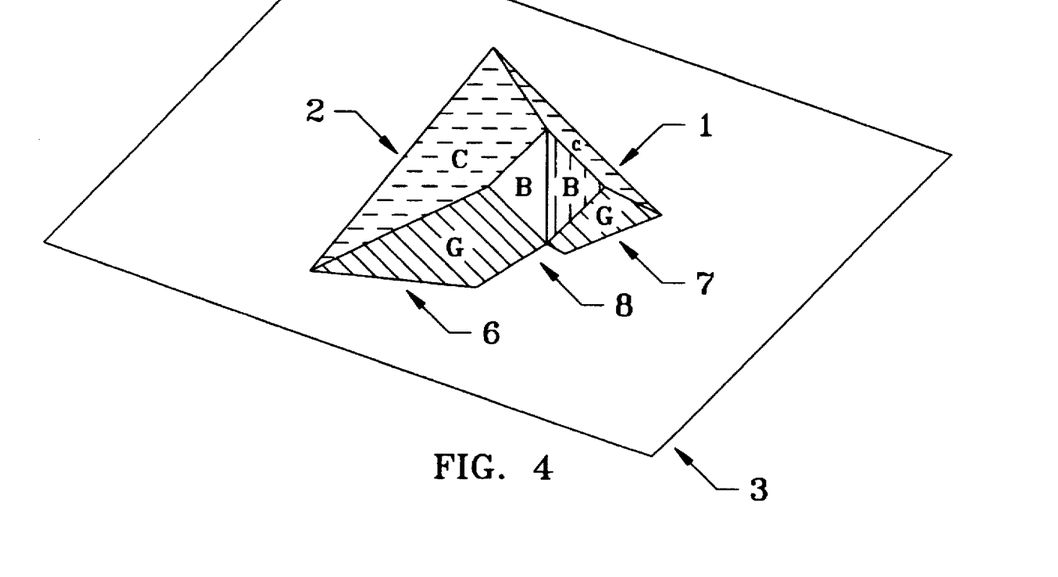
FIG. 4 is an isometric view of mirror image pair of the blocks of the present invention, shown in meta-stable configuration.
Figure 5A:
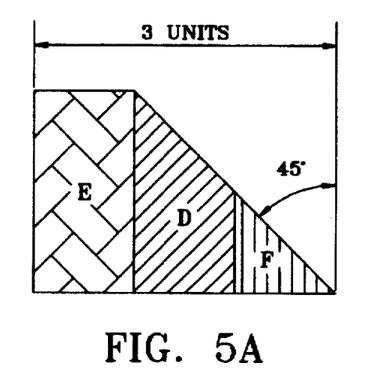
FIG. 5A is a top plan view thereof.
Figure 5B:
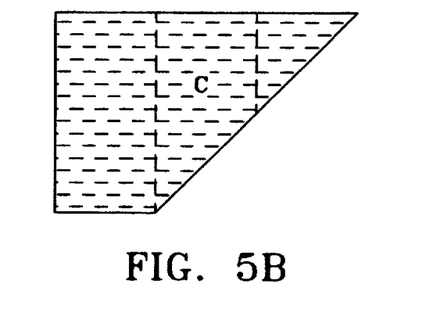
FIG. 5B is a bottom view thereof.
Figure 5C:
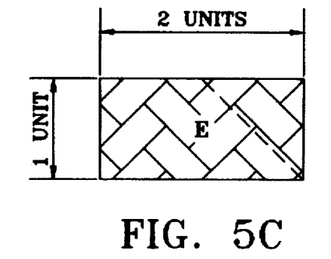
FIG. 5C is a left side elevational view thereof.
Figure 5D:
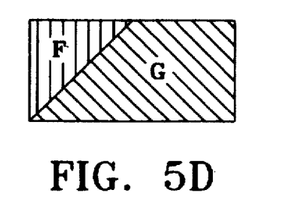
FIG. 5D is a right side elevational view thereof.
Figure 5E:
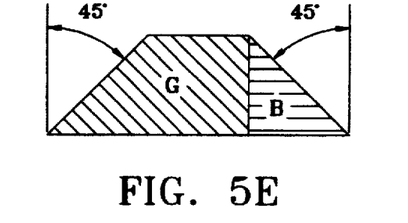
FIG. 5E is a rear view thereof.
Figure 5F:
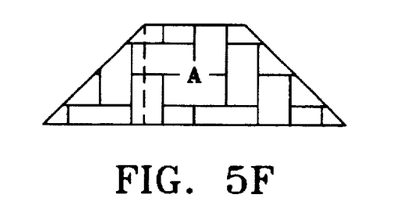
FIG. 5F is a front view thereof.
Figure 6A:
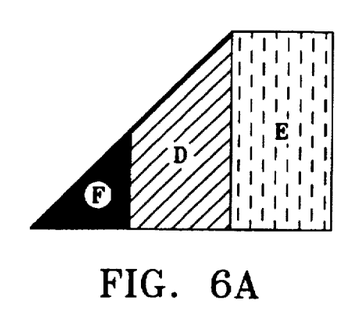
FIG. 6A is a top plan view thereof.
Figure 6B:
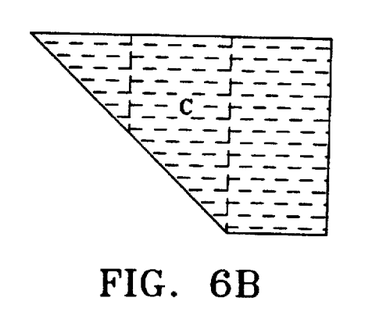
FIG. 6B is a bottom view thereof.
Figure 6C:
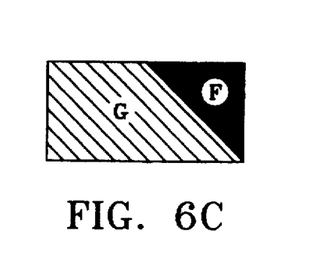
FIG. 6C is a left side elevational view thereof.
Figure 6D:
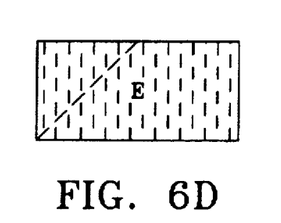
FIG. 6D is a right side elevational view thereof.
Figure 6E:
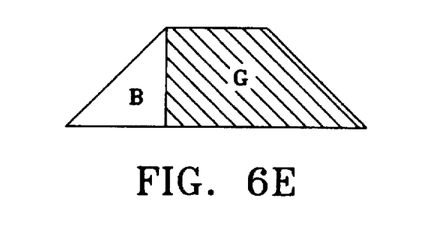
FIG. 6E is a rear view thereof.
Figure 6F:
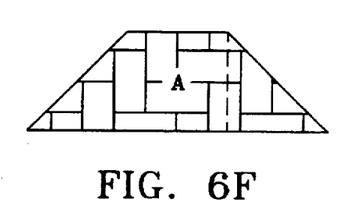
FIG. 6F is a front view thereof.

FIG. 4 shows a mirror image pair of blocks 1,2 on base pad 3 in a special "meta-stable" configuration. Individual blocks will not stand unaided on face B or F. However, a mirror image pair with left block 1 and right block 2 will stand on face F, as shown in FIG. 4, with mutual support of contact surfaces E. Edges 6 and 7 of faces G are in contact with the base pad. An interesting inverted "V" tunnel at 8 results from this configuration, while block faces B protrude in a long cantilever.

Although any number of mirror image pairs can be included in a set, one including 16 pairs of blocks 1,2 can support the construction of thousands of different interesting configurations which mimic strong architectural patterns or even natural forms.

High friction base pad 3 included in the set of blocks enhances the building of different configurations by helping to keep blocks 1,2 from moving. High friction base pad 3 can be a foam rubber or polyurethane pad; pads of the type often used with a personal computer as "mouse pads" work well.

FIGS. 7A–7D illustrate four possible configurations of the thousands of possible configurations which can be made with the set of blocks as in FIGS. 2A–2B. It is not possible to well represent the further interest introduced by shadows cast by directional lighting in FIGS. 2A–2B.

The amount of light on similarly colored faces changes their visual character, thus adding another dimension to their visual interests.

Figures 7A, 7B:
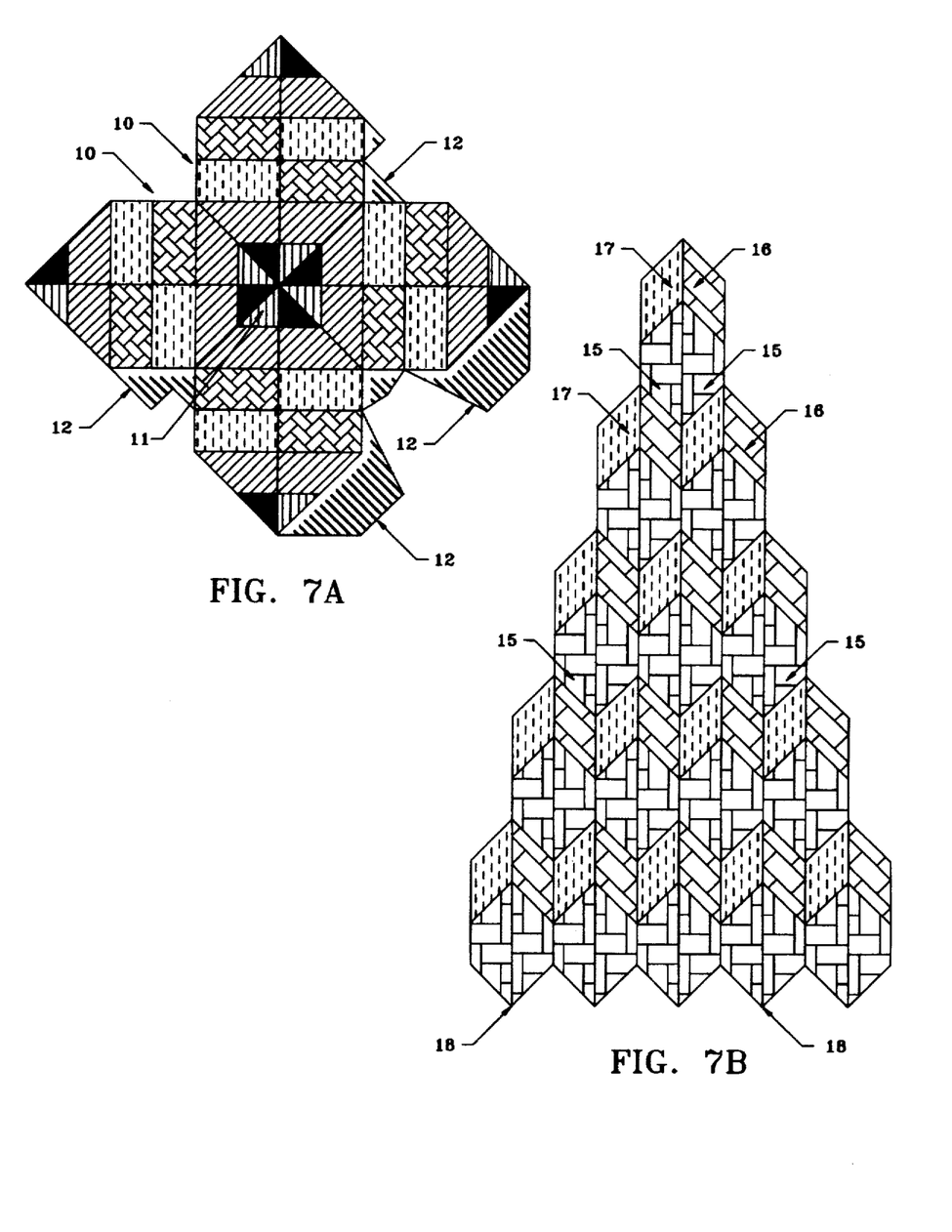
FIG. 7A shows a construction with a center depression.
FIG. 7B shows a pattern construction.

For example, in FIG. 7A a structural configuration with a central depression 11 is formed from eight mirror image pairs of blocks 1,2. "V" shaped troughs 10 are formed around the periphery. Shadows 12 are shown around the edges.

In FIG. 7B, quite a different type of pattern construction is depicted. This shows the use of fifteen mirror image pairs 1,2, each joined at their respective faces 18 and placed in a simple array. The bright color of their prominent faces 15, such as for example, the color sunflower yellow, dominates this view with the contrasting faces 16 and 17 delineating the architectural lines.

Figure 7C:
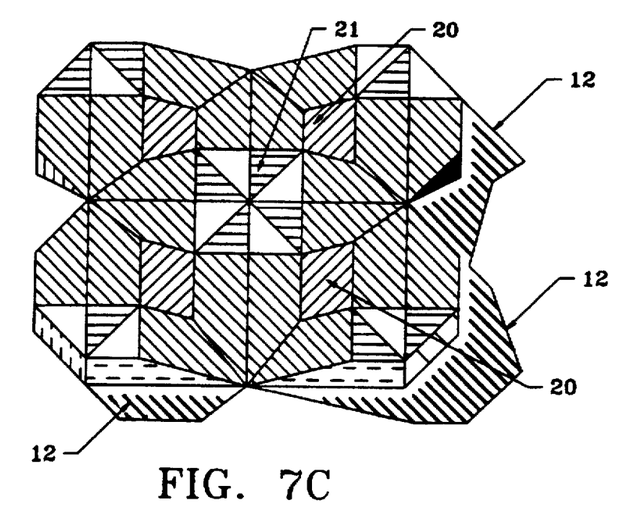
FIG. 7C shows a construction with central rise.

FIG. 7C depicts yet another configuration with a raised center section 21 and interesting depressions 20 lined in hot pink. Highly directional lighting, such as for example from a sunlit window, casts long shadows 12.

Figure 7D:
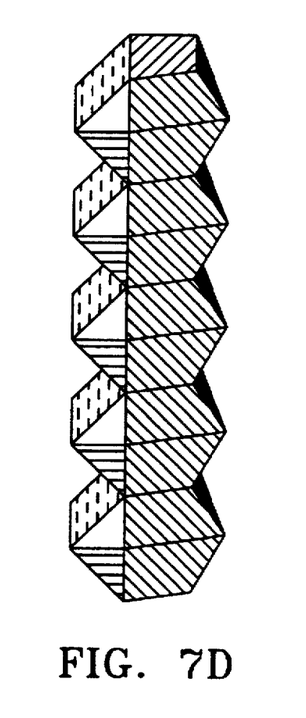
FIG. 7D shows a vertical column.

FIG. 7D depicts yet a further construction of a vertically oriented column, constituted from pairs of mirror image blocks 1,2 placed on top of each other. Because of the weight distribution and geometry of each of the blocks, pairs of blocks 1,2 may be vertically stacked with no need for side supports from other blocks. Although FIG. 7D shows five pairs of two blocks 1,2, it is known that upwards of many more pairs of blocks 1,2 may be vertically assembled.

Small blocks 1,2 can be made by a process often used in the picture framing industry. Blocks 1,2 can be "chopped" from a rectangular cross section wooden stock by using a "chopper" machine. Blocks 1,2 can be hand painted. Alternatively, the blocks can be injection molded in any convenient size of a thermoplastic resin. Blocks 1,2 may be hollow or solid.

Preferably the surface sides of each block 1 or 2 has a textured matte surface, to increase its ability to be manually grasped and to provide a friction surface to permit the blocks to remain in place in an assembled position. Moreover, to increase stability, while injection molded blocks 1, 2 may be hollow, preferably the blocks are solid.

To permit the safe use of blocks 1,2 for children under the age of four, the size of the blocks should be large enough as to not pose a choking hazard, and the corners may be slightly rounded to reduce sharp corners. These molded blocks can also be hand painted although this is a labor intensive procedure. Two alternatives to hand painting are illustrated in FIGS. 8 and 9.

Figure 8:
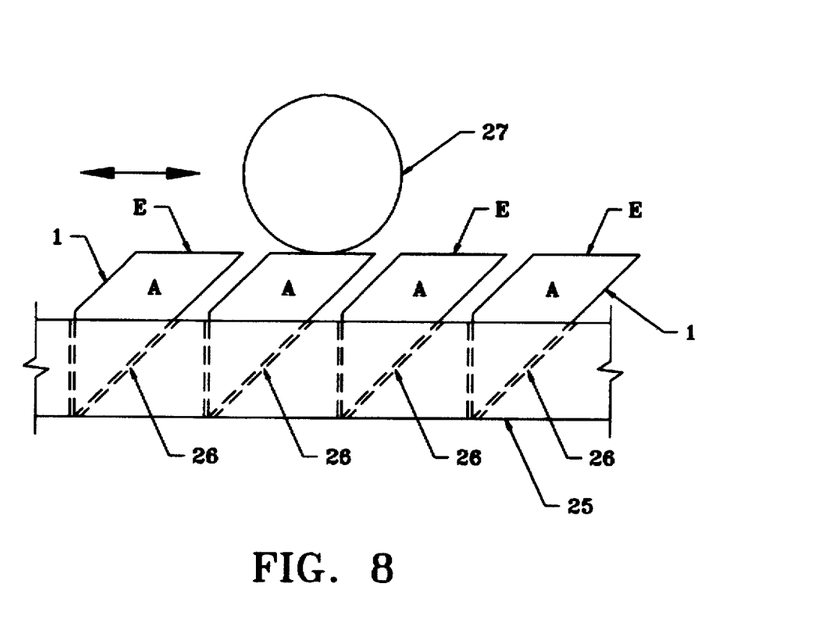
FIG. 8 shows a painting fixture used with the blocks of the present invention; and, FIG. 9 is an alternate embodiment for a block configuration inlays.

For example, FIG. 8 illustrates the use of a plastic pan 25 with a vacuum or pressure formed (molded) bottom pattern which holds the blocks 1 in the pockets formed 26 such that face E is held horizontal. Face E can then be painted by roller 27 in an efficient fashion. This can be a small manual operation, or it can be fully automated by state-of-the-art factory techniques.

Different pans with different molded bottoms are needed to hold the pairs of blocks 1,2 in the appropriate orientation, to paint faces A, C, E, F, and G. Faces D, and B can be painted in pans 25 with a flat bottom since these faces are normally horizontal and highly stable when resting on their opposite faces. In these latter cases the sides of the pan must just be sized to keep a convenient number of blocks 1,2 from shifting during the roller-painting process.

Figure 9:
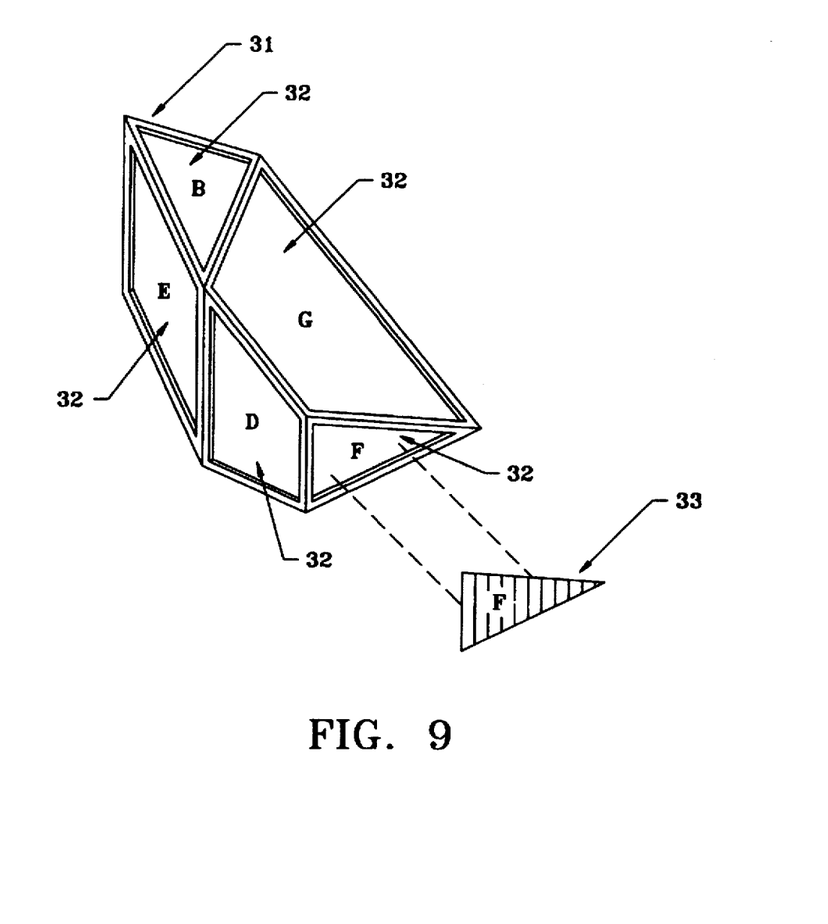

While the roller painting technique can be used for blocks of any material, FIG. 9 illustrates a construction technique reserved for molded blocks and which is more amenable to larger blocks. Block 30 is preferably molded of a thermoplastic resin with recessed face panels 32 enclosed by a raised frame 31 which defines the geometric edge shape of block 1 or 2. Block 1 is made in a resin of a neutral color such as "cream". Insert panels 33 of the correct size and shape are die cut of rigid sheets of colored plastic and adhesively bonded within the recesses in the block. In this manner, a very durable block with bright damage resistant colors can be manufactured in an efficient manner. The resulting block has smooth faces since the inserts 33 fit flush within the recesses 32 and resist attempts to pry them out. Alternative attachment methods for the insert panels include a press fit along the edges, thermal edge bonding or ultrasonic bonding.

Another method is to mold blind holes into the recesses 32 and mold the corresponding inserts 33 of colored resins with strategically located nibs which fit in registration with the molded recess holes. The insert panels are then just to be press fit as the nibs would be appropriately sized for a press fit. For larger sizes, blocks 30 can be molded of closed cell thermoplastic foam material similar to that used in material sold under the Sintra brand name. This reduces weight and material cost, since weight reduction is a safety feature.

It is further noted that other modifications may be made to the present invention, without departing from the scope of the invention, as noted in the appended claims.

I claim:

1. A set of building blocks comprising:
   a plurality of three dimensional blocks of one general configuration, wherein two different sub-types of said blocks are mirror images of each other, said blocks each having a plurality of "S" number of sides, each said block having a peaked portion including a protruding and cantilevered element, wherein each block of said pairs of blocks independently stands unaided on "S–2" number of said plurality of sides of each of said blocks, wherein each said mirror image block includes a rectangle, two triangles, a trapezoid and three truncated rectangles, which said truncated rectangles each form a right angle triangle above a contiguous rectangle.

2. The set of building blocks as in claim 1 wherein each said block of said pair of mirror image blocks may be placed back-to-back with an opposite mirror image block.

3. The set of building blocks as in claim 1 wherein when each block is placed adjacent a mirror image block, wherein further each said block stands supported on any one side of "S–1" number of sides of said plurality of sides.

4. The set of building blocks as in claim 1 wherein corresponding surfaces of each of said blocks of said mirror image pairs of blocks are of the same color.

5. The set of building blocks as in claim 1 wherein at least one pair of corresponding surfaces of each of said blocks is in harmoniously contrasting colors.

6. The set of building blocks as in claim 1 wherein corresponding surfaces of each of said blocks of said pair of blocks include a variety of different harmonious colors.

7. The set of building blocks as in claim 6 wherein a plurality of harmonious colors are applied to respective surfaces of each of said blocks.

8. The set of building blocks as in claim 1 wherein said peaked cantilevered portion of each of said blocks extends upward from a base of each of said blocks.

9. The set of building blocks as in claim 1 wherein at least one surface of each of said blocks is an isosceles trapezoid.

10. The set of building blocks as in claim 1 wherein said blocks are wooden.

11. The set of building blocks as in claim 1 wherein said blocks are molded plastic.

12. The set of building blocks as in claim 1 wherein said blocks are solid.

13. The set of building blocks as in claim 1 where in said blocks are hollow.

14. The set of building blocks as in claim 1 wherein corresponding planes of one type of each said block and its said mirror image block are painted in complementary colors.

15. A set of building blocks comprising:

a plurality of three dimensional blocks of one general configuration, wherein two different sub-types of said blocks are mirror images of each other, said blocks each having a plurality of "S" number of sides, each said block having a peaked portion including a protruding and cantilevered element, wherein each block of said pairs of blocks independently stands unaided on "S–2" number of said plurality of sides of each of said blocks, wherein each block is molded of a thermoplastic resin with recessed face panels enclosed by a raised frame which defines the geometric edge shape of each block, wherein further insert panels are attached within recesses in each said block.

16. A method of making a block of a set of building blocks, wherein said set of blocks includes a plurality of three dimensional blocks of one general configuration, wherein two different sub-types of said blocks are mirror images of each other, said blocks each having a plurality of "S" number of sides, each said block having a peaked portion including a protruding and cantilevered element, wherein each block of said pairs of blocks independently stands unaided on "S–2" number of said plurality of sides of each of said blocks, said method comprising the steps of;

starting with a rectangular block three units long, two units wide and one unit high, making three cuts at about 45 degree angles to the three major axes of said rectangular block, removing sections including triangular faces, making a first cut of said three cuts from a bottom of said block at one end of the length leading upward through the height at 45 degrees, making a second cut of said three cuts from an opposite end of the length of said rectangular block, from said bottom thereof, leading upward at about 45 degrees, wherein said block has an isosceles trapezoidal cross section with a base three units long and a top one unit long, and, making a third cut of said three cuts at about 45 degrees to the length dimension through the height from one corner of said block.

\* \* \* \* \*